Patented June 10, 1930

1,763,325

UNITED STATES PATENT OFFICE

DONALD H. POWERS, OF PENNS GROVE, NEW JERSEY, ASSIGNOR TO E. I. DU PONT DE NEMOURS & COMPANY, OF WILMINGTON, DELAWARE, A CORPORATION OF DELAWARE

VULCANIZATION OF RUBBER

No Drawing.   Application filed August 31, 1926. Serial No. 132,895.

This invention relates to an improvement in the vulcanization of rubber and more particularly to the use of a new compound as an accelerator of vulcanization to be more specifically referred to hereinafter.

I have discovered that benzo thiazole monosulfides constitute excellent accelerators for the vulcanization of rubber and provide a superior rubber product. I have also found a convenient and suitable process for the formation of this type of accelerator compound. The application of these accelerators or agents in the vulcanization of rubber may be carried out in a manner already generally known in the art. That is to say, the formulas, mode of mixing, etc., may be varied very widely in making use of this new class of accelerators.

I, therefore, give merely by way of a suitable embodiment of the invention the following composition of stock:

|  | Parts |
|---|---|
| Amber crêpe | 50 |
| Smoked sheets | 50 |
| Zinc oxide | 3 |
| Sulphur | 3.5 |
| Thiazyl monosulfide | 1 |

The usual manipulative procedure adopted in the vulcanization of rubber may, of course, be applied in this case also and the temperatures of vulcanization used will, of course, be controlled in a suitable manner with the understanding that a lower temperature of vulcanization may be used if a longer time of curing and a larger percentage of the accelerator is employed, and that when using higher temperatures a shorter time of cure or less accelerator may be used.

I have found that various benzo thiazole monosulfides may be thus employed and for purposes of illustration I include the following table to show the general effects of certain accelerators, although it is to be understood that these values are not limited, and may, of course, vary to some extent, according to the manner of curing, the quantities of accelerators and general conditions of compounding and vulcanization.

|  | Cure | | Tens. str. at break (lbs./sq. in.) | Elongation |
|---|---|---|---|---|
|  | Time in minutes | Pressure (pounds) | | |
| Benzo thiazyl monosulphide | 20 | 40 | 2,420 | 800 |
| 3-methyl benzo thiazyl monosulphide | 20 | 40 | 3,040 | 815 |
|  | 30 | 30 | 3,230 | 810 |
| Naphtho thiazyl monosulphide | 20 | 40 | 3,060 | 815 |

I have also discovered a method of preparing the accelerators to be used in the carrying out of this invention, and as an example I present a process for the production of benzo thiazole monosulfide as follows:

Two thousand pounds of sodium mercapto benzo thiazole prepared by dissolving mercapto benzo thiazole in the calculated amount of dilute caustic soda solution, is made up to a weight of twenty thousand pounds of aqueous solution. This solution is preferably cooled below 10° C. and while being agitated, six hundred and fifty pounds of cyanogen chloride are added using the usual precautions for handling this material and avoiding over-heating. The benzo thiazole monosulphide separates as a yellow crystalline water-insoluble product. It may be readily recrystallized from alcohol, but the product as it separates from the aqueous solution is of very good purity. The monosulphide is then filtered and dried.

Substituted benzo thiazole monosulfides may also be prepared in a similar manner starting with the substituted benzo thiazole. Of particular importance is the methyl benzo thiazole monosulfide prepared from 3-methyl benzo thiazole. Alkyl, hydroxy, or alkoxy substituted benzo thiazole monosulfides may also be prepared and used to aid the vulcanization of rubber or to act as accelerators therein, as the case may be, and these and other modifications in this class of compounds are to be understood as being comprised within the scope of my invention. The probable mechanism of the reaction for the formation of these compounds is as follows:

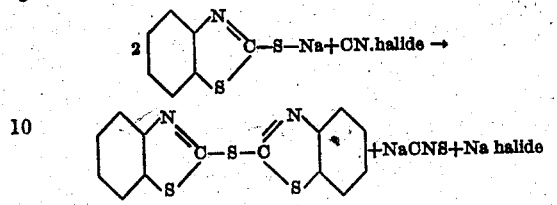

As many apparently widely different embodiments of this invention may be made without departing from the spirit thereof, it is to be understood that I do not limit myself to the foregoing examples or description, except as indicated in the following patent claims.

I claim:

1. The process of treating rubber, which comprises vulcanizing said rubber in the presence of di benzo thiazole mono-sulphide.

2. The process of treating rubber, which comprises heating the same with a vulcanizing agent in the presence of a small proportion of a reaction product of a mercapto benzo thiazole and a cyanogen halide.

3. The process of vulcanizing rubber comprising heating the same in the presence of a vulcanizing agent and a yellow crystalline product formed by the reaction of cyanogen chloride and the sodium salt of mercapto-benzo-thiazole, said product being soluble in alcohol and insoluble in water.

4. The process of treating rubber, which comprises vulcanizing said rubber in the presence of a member of the group consisting of di benzo thiazole mono-sulphide, di-3-methyl benzo thiazole mono-sulphide and di naphtho thiazole mono-sulphide.

In testimony whereof I affix my signature.

DONALD H. POWERS.